(12) United States Patent
Salter et al.

(10) Patent No.: US 11,932,156 B2
(45) Date of Patent: Mar. 19, 2024

(54) VEHICLE HAVING SLIDING CONSOLE

(71) Applicant: Ford Global Technologies, LLC, Dearborn, MI (US)

(72) Inventors: Stuart C. Salter, White Lake, MI (US); Hussein H. Berry, Dearborn, MI (US); Annette Lynn Huebner, Highland, MI (US); Marguerite Lynn Kimball, Brighton, MI (US); David Brian Glickman, Southfield, MI (US); Gregory Paul Thomas, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 528 days.

(21) Appl. No.: 17/321,739

(22) Filed: May 17, 2021

(65) Prior Publication Data
US 2022/0363177 A1 Nov. 17, 2022

(51) Int. Cl.
*B60N 3/10* (2006.01)
*A01K 7/02* (2006.01)
*A01K 11/00* (2006.01)
*A01K 29/00* (2006.01)
*B60N 2/00* (2006.01)
(Continued)

(52) U.S. Cl.
CPC .............. *B60N 3/102* (2013.01); *A01K 7/02* (2013.01); *A01K 11/006* (2013.01); *A01K 29/005* (2013.01); *B60N 2/002* (2013.01); *B60N 2/01* (2013.01); *B60R 16/037* (2013.01);
(Continued)

(58) Field of Classification Search
CPC .... B60N 2/002; B60N 2/0024; B60N 2/0026; B60N 2/0027; B60N 2/0028; B60N 3/102; B60R 13/037; B60R 16/037; B60R 2011/0007; A01K 7/02; A01K 11/006; A01K 29/005; H04W 4/023; H04W 4/029
See application file for complete search history.

(56) References Cited

U.S. PATENT DOCUMENTS 5,724,920 A 3/1998 Meisman et al.
7,015,799 B1 * 3/2006 Kitano ................ B60R 11/0264
280/727

(Continued)

FOREIGN PATENT DOCUMENTS

CN 109839929 A 6/2019
JP 2006219009 A 8/2006

*Primary Examiner* — Gregory A Blankenship
(74) *Attorney, Agent, or Firm* — Vichit Chea; Price Heneveld LLP

(57) ABSTRACT

A vehicle is provided that includes a vehicle body defining a cabin interior and comprising a front row of seats and a rear row of seats, a plurality of seats located within the cabin interior, and a monitoring system for detecting and monitoring a pet or passenger within the cabin interior. The vehicle also includes a movable center console positioned between a pair of the forward row of seats and forward of the rear row of seats and comprising a holder for holding a drink container, and a controller processing signals generated by the monitoring system and determining a location of the detected pet or passenger on the rear row of seats based on the processed signals, the controller further controlling the movable console between a forward first position and a rearward second position closer to the rear row of seats.

20 Claims, 6 Drawing Sheets

(51) Int. Cl.
  *B60N 2/01* (2006.01)
  *B60R 11/00* (2006.01)
  *B60R 16/037* (2006.01)
  *H04W 4/02* (2018.01)
  *H04W 4/029* (2018.01)

(52) U.S. Cl.
  CPC .......... *H04W 4/023* (2013.01); *H04W 4/029* (2018.02); *B60R 2011/0007* (2013.01)

(56) References Cited

U.S. PATENT DOCUMENTS

| | | |
|---|---|---|
| 7,527,017 B1 | 5/2009 | Cribb |
| 7,600,486 B2 | 10/2009 | Ellis |
| 8,100,084 B1 | 1/2012 | Abramson |
| 8,117,991 B1 * | 2/2012 | Civitillo .................. A01K 7/027 |
| | | 119/72 |
| 8,146,534 B1 | 4/2012 | Robertson |
| 8,258,932 B2 | 9/2012 | Wahlstrom |
| 8,768,292 B2 | 7/2014 | Welch |
| 9,227,484 B1 | 1/2016 | Justice et al. |
| 9,392,770 B2 | 7/2016 | Almeida |
| 9,463,805 B2 | 10/2016 | Kirsch et al. |
| 9,637,085 B2 | 5/2017 | Sanchez Huipio et al. |
| 9,654,103 B2 | 5/2017 | Buttolo et al. |
| 9,845,050 B1 * | 12/2017 | Garza ................. G08B 21/0205 |
| 9,975,481 B2 | 5/2018 | Hatton et al. |
| 10,091,972 B1 | 10/2018 | Jensen et al. |
| 10,115,029 B1 | 10/2018 | Day et al. |
| 10,303,961 B1 | 5/2019 | Stoffel et al. |
| 10,352,759 B1 | 7/2019 | Jensen |
| 10,649,061 B2 | 5/2020 | Bjorkengren |
| 10,742,969 B1 | 8/2020 | Rohatgi et al. |
| 10,785,604 B1 | 9/2020 | Kumar et al. |
| 11,067,452 B1 | 7/2021 | Lee et al. |
| 11,562,550 B1 | 1/2023 | Asghar et al. |
| 2002/0169583 A1 | 11/2002 | Gutta et al. |
| 2007/0131177 A1 | 6/2007 | Perkitny |
| 2008/0246318 A1 | 10/2008 | Bothe et al. |
| 2009/0224564 A1 * | 9/2009 | O'Brien ................. B60N 2/793 |
| | | 296/37.8 |
| 2010/0305816 A1 | 12/2010 | Orlewski |
| 2014/0309806 A1 | 10/2014 | Ricci |
| 2014/0309862 A1 | 10/2014 | Ricci |
| 2014/0310739 A1 | 10/2014 | Ricci et al. |
| 2014/0319895 A1 | 10/2014 | Lange-Mao et al. |
| 2015/0342143 A1 | 12/2015 | Stewart |
| 2016/0070527 A1 | 3/2016 | Ricci |
| 2016/0227732 A1 | 8/2016 | Pompey |
| 2016/0272112 A1 | 9/2016 | DeGrazia et al. |
| 2016/0272120 A1 * | 9/2016 | Johnston ................. B60N 3/102 |
| 2016/0357262 A1 | 12/2016 | Ansari |
| 2018/0162283 A1 * | 6/2018 | Ranganathan ........... B60N 2/06 |
| 2018/0194194 A1 | 7/2018 | Lyubich et al. |
| 2019/0016235 A1 * | 1/2019 | Parida ................... B60R 16/037 |
| 2019/0039525 A1 * | 2/2019 | Hu ......................... B60R 7/005 |
| 2019/0118603 A1 | 4/2019 | Feit |
| 2019/0279447 A1 | 9/2019 | Ricci |
| 2019/0389352 A1 * | 12/2019 | Koller ..................... B60N 2/77 |
| 2020/0070708 A1 * | 3/2020 | Kim ....................... B60N 3/105 |
| 2020/0085004 A1 | 3/2020 | Yoo et al. |
| 2020/0130702 A1 | 4/2020 | Ferreira et al. |
| 2020/0307483 A1 | 10/2020 | Topf et al. |
| 2020/0383580 A1 | 12/2020 | Shouldice et al. |
| 2020/0406825 A1 * | 12/2020 | Wang ....................... B60R 9/10 |
| 2021/0232642 A1 | 7/2021 | Ricci |
| 2021/0245666 A1 * | 8/2021 | Atang ....................... B60R 7/04 |
| 2022/0112760 A1 | 4/2022 | Demele et al. |
| 2022/0134959 A1 * | 5/2022 | Harmon ................... B60R 7/04 |
| | | 296/37.15 |
| 2022/0151202 A1 * | 5/2022 | Salter ....................... B60N 3/18 |
| 2022/0153133 A1 * | 5/2022 | Salter ....................... B60N 3/18 |
| 2022/0242323 A1 * | 8/2022 | Bork ..................... B60N 2/0264 |
| 2022/0282543 A1 * | 9/2022 | Elsarelli ............. B60N 2/02246 |
| 2022/0355710 A1 * | 11/2022 | Salter ..................... B60N 2/0244 |
| 2022/0355813 A1 * | 11/2022 | Salter ..................... B60K 37/06 |
| 2022/0363177 A1 * | 11/2022 | Salter ..................... H04W 4/023 |
| 2022/0385327 A1 * | 12/2022 | Iliffe-Moon .......... G06F 3/0346 |
| 2023/0106673 A1 | 4/2023 | Asghar et al. |
| 2023/0230121 A1 | 7/2023 | Chintakindi et al. |
| 2023/0341535 A1 * | 10/2023 | Zhang ..................... G01S 13/04 |

* cited by examiner

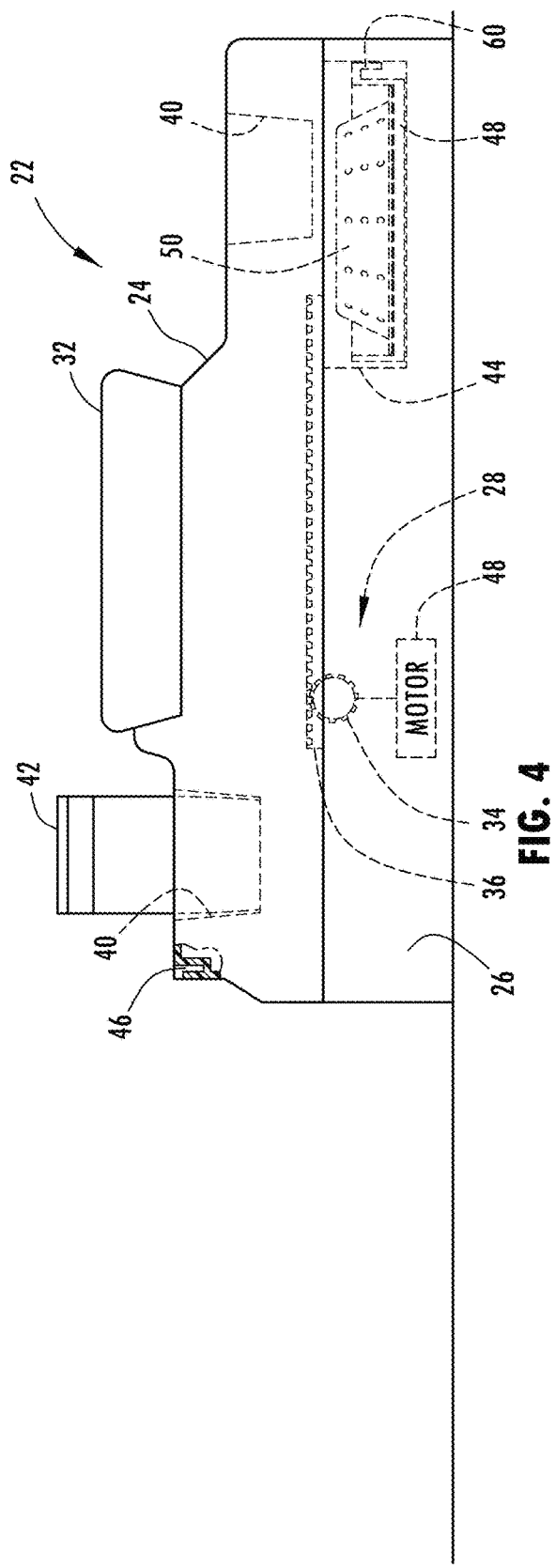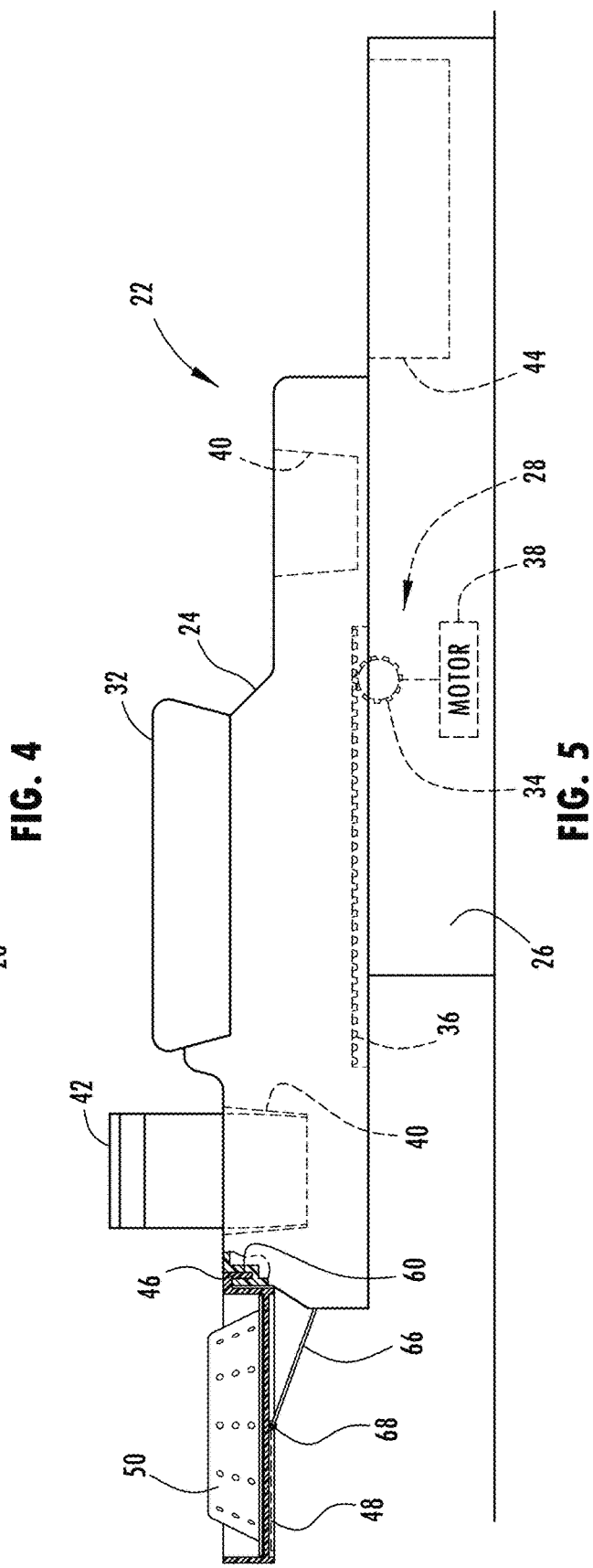

VEHICLE HAVING SLIDING CONSOLE

FIELD OF THE DISCLOSURE

The present disclosure generally relates to transport vehicles, and more particularly relates to a vehicle that monitors location of occupant(s) in the vehicle and controls movement of a sliding console.

BACKGROUND OF THE DISCLOSURE

Automotive vehicles are commonly used to transport passengers and pets, such as dogs, cats and other animals. Passengers are typically seated in passenger seats. When traveling in a vehicle, pets may often travel without cages or other restraint devices, such that the pet generally may move about the passenger compartment of the cabin interior. In doing so, pets may sit or lay down on the passenger seats. It may be desirable to provide for enhanced presentation of content such as drinks to a pet or passenger in the vehicle.

SUMMARY OF THE DISCLOSURE

According to a first aspect of the present disclosure, a vehicle is provided including a vehicle body defining a cabin interior, a plurality of seats located within the cabin interior, a monitoring system for detecting and monitoring a pet or passenger within the cabin interior, a movable console positioned forward of a seat and comprising a holder for holding an item, and a controller processing signals generated by the monitoring system and determining a location of the detected pet or passenger on the seat based on the processed signals, the controller further controlling the movable console between a first position and a second position to move the holder closer to the detected pet or passenger.

Embodiments of the first aspect of the disclosure can include any one or a combination of the following features:
- the movable console is a sliding console comprising an actuator for actuating at least a portion of the console with the drink holder forward to the first position and rearward to the second position;
- the sliding console is a sliding center console located between a pair of front row seats, and wherein the sliding console moves from the first position to the second position closer to a rearward second row of seats;
- the holder comprises a drink holder for holding a drink container;
- the holder comprises a bin holding a pet bowl configured for use by a pet;
- the pet bowl further comprises a capacitive sensor for sensing an amount of liquid in the pet bowl;
- the holder comprises a recessed drink holder configured for holding a drink container for use by a passenger;
- the monitoring system comprises one or more imaging devices for capturing image signals of the pet or passenger within the vehicle, wherein the controller processes the captured image signals to determine a presence of the pet or passenger and a location of the pet or passenger within the vehicle;
- the monitoring system comprises a plurality of first RF signal communication devices located at a plurality of locations on the vehicle, and a second RF signal communication device configured to be located on a pet for communicating RF signals with the plurality of first RF signal communication devices, wherein the controller processes the RF signals and determines the location of the pet based on the processed RF signals; and
- the second RF signal communication device is located on a wearable device of the pet.

According to a second aspect of the present disclosure, a vehicle is provided including a vehicle body defining a cabin interior and comprising a front row of seats and a rear row of seats, a plurality of seats located within the cabin interior, a monitoring system for detecting and monitoring a pet or passenger within the cabin interior, a movable center console positioned between a pair of the front row of seats and forward of the rear row of seats and comprising a drink holder for holding a drink container, and a controller processing signals generated by the monitoring system and determining a location of the detected pet or passenger on the rear row of seats based on the processed signals, the controller further controlling the movable console between a forward first position and a rearward second position closer to the rear row of seats to move the drink holder closer to the detected pet or passenger.

Embodiments of the second aspect of the disclosure can include any one or a combination of the following features:
- the movable console is a sliding console comprising an actuator for actuating at least a portion of the console with the drink holder forward to the forward first position and rearward to the rearward second position;
- the drink holder comprises a bin holding a pet bowl configured for use by a pet;
- the pet bowl further comprises a capacitive sensor for sensing an amount of liquid in the pet bowl;
- the drink holder comprises a recessed drink holder configured for holding a drink container for use by a passenger;
- the monitoring system comprises one or more imaging devices for capturing image signals of the pet or passenger within the vehicle, wherein the controller processes the captured image signals to determine a presence of the pet or passenger and a location of the pet or passenger within the vehicle;
- the monitoring system includes a plurality of first RF signal communication devices located at a plurality of locations on the vehicle, and a second RF signal communication device configured to be located on a pet for communicating RF signals with the plurality of first RF signal communication devices, wherein the controller processes the RF signals and determines the location of the pet based on the processed RF signals; and
- the second RF signal communication device is located on a wearable device of the pet.

According to a third aspect of the present disclosure, a method of controlling a sliding console in a vehicle is provided. The method comprising the steps of detecting a pet or passenger within the vehicle with a monitoring system, determining a location of the pet or passenger within the vehicle on a seat, and controlling the sliding console with a controller to adjust a position of the sliding console to move the sliding console with a drink holder toward the pet or passenger detected in the seat.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a side view of the center console in the first position with drink holders and a pet bowl in a first position;

FIG. 5 is a side view of the center console in the second position with the drink holders and pet bowl in a bin attached to the rear end of the sliding console;

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
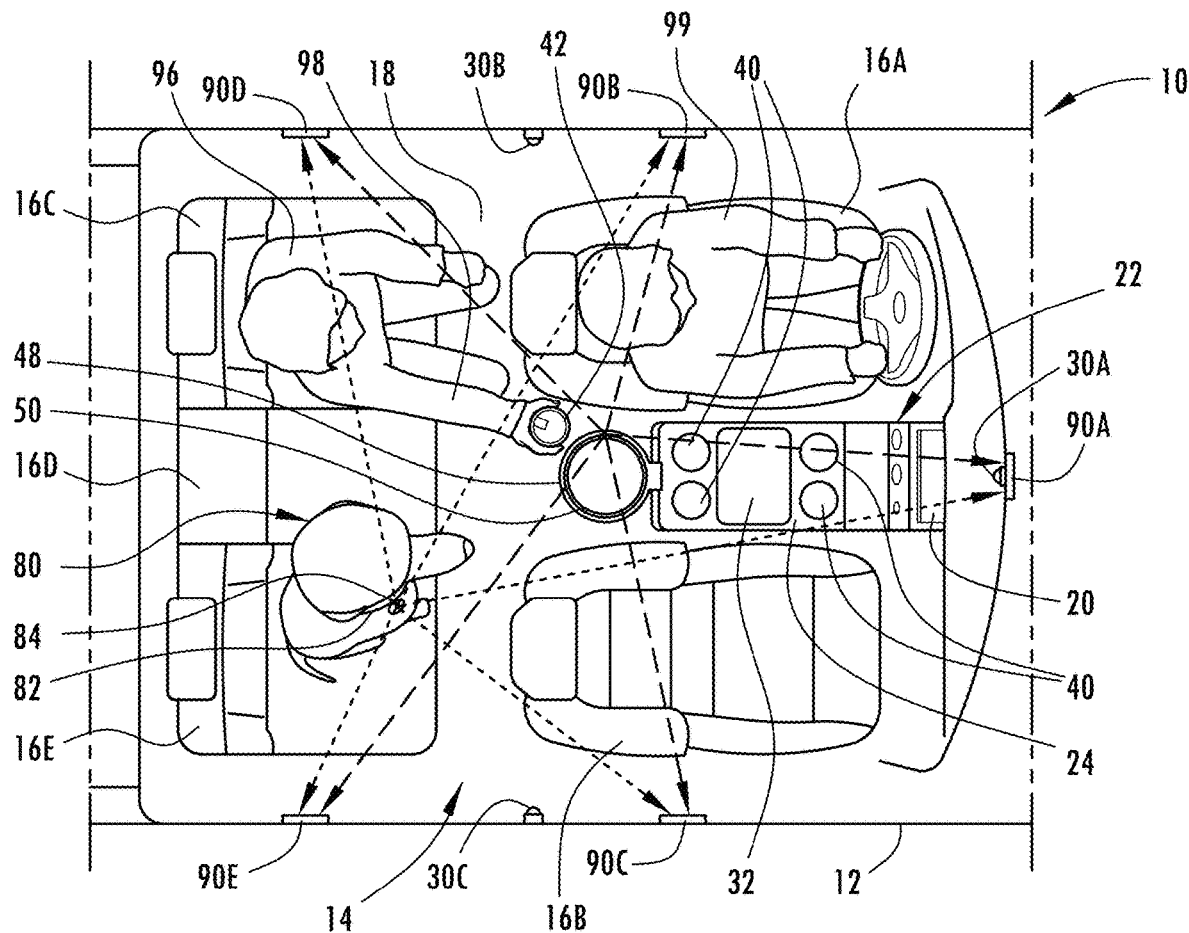
FIG. 1 is a top view of a cabin interior of a vehicle transporting a passenger and a pet seated on passenger seats within the cabin interior and equipped with RF signal communication devices and imaging devices and a movable center console in a first position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to occupant detection and control of a movable console in a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, the cabin interior 14 of a wheeled automotive or motor vehicle 10 is generally illustrated configured with passenger seating and accommodations for transporting occupants in the form of living beings such as passengers (e.g., human beings) and pets. The cabin interior 14 is generally defined by a vehicle body 12 and may contain various features and trim components within the vehicle body 12. The cabin interior 14 is shown having an arrangement of passenger seats including a first or front row of driver and passenger seats 16A and 16B and a second or rear row of three seats 16C-16E shown as bench or split bench seating. The vehicle 10 may also possess additional rows of seating as in the case of a typical large SUV, van or bus. The vehicle body 12 further defines a floor 18 upon which the seating is assembled. It should be appreciated that the vehicle 10 may be a motor vehicle, such as a wheeled car, truck, SUV, van or bus, for example, or an airplane, train, boat or other vehicle capable of transporting people and pets.

The vehicle 10 is equipped with a movable center console 22 shown located between the front row driver seat 16A and front row passenger seat 16B. As such, the center console 22 separates the front row driver seat 16A from the front row passenger seat 16B. The console 22 may be located between two rear seats and both the front row of seats and rear row of seats may have a console. It should be appreciated that one or more pets 80 and passengers 96 may be located on or any of the seats 16A-16E while the vehicle 10 is operating. However, the driver seat 16A is provided to accommodate seating of the driver 99 of the vehicle 10 as opposed to a non-driving passenger 96 or pet 80. For a fully autonomous vehicle, when a driver 99 is not present it is possible that a passenger 96 or pet 80 may be located on the driver seat 16A.

The driver 99 is shown seated in the driver seat 16A such that the driver 99 may operate the vehicle 10 such as by controlling the steering wheel, accelerator pedal, brake pedal, etc. In addition, the rear row seated passenger 96 is shown seated on rear row seat 16C. The rear passenger 96 is therefore located in the second row of seating which is rearward of the center console 22. The passenger 96 is shown holding a drink container 42 in the arm and hand 98 thereof. A monitoring system may monitor the location of the passenger 96 on a seat in the rear row of seating and may determine if the passenger has a drink container extended in their arm and hand 98 such that it may be desirable to move the center console 22 closer to the passenger 96. Similarly, a passenger 96 detected with their arm and hand 98 extended reaching toward a drink holder on the center console 22 may also initiate movement of the center console 22 from the forward first position to the rearward second position to allow enhanced access to a drink container in the drink holder.

The center console 22 is shown having a plurality of drink holders 40 configured to receive drink containers. The center console 22 may have one or more holders configured to receive one or more items, such as drink containers, smartphones, keys, writing instruments, etc. Each drink holder 40 may be a circular recessed bin, according to one example. The rearmost drink holders 40 may allow the rear seated passenger 96 to place the drink container 42 in the drink holder 40 or remove the drink container 42 from the drink holder 40 when the passenger's arm and hand 98 is extended outward as shown in FIG. 1.

In addition, a pet bowl 50 is shown attached to the rear end of the center console 22. The pet bowl 50 is an item that may be held in a holder shown as an attachable bin 48 and may be removable therefrom. As such, the pet bowl 50 which may contain content in the form of a drink, e.g., water or food, is presented at the rear end of the center console 22 generally forward of the pet 80. According to one exemplary embodiment, the center console 22 is configured as a sliding center console that may move between a forward first position shown in FIG. 1 and a rearward second position shown in FIG. 2. In the rearward second position shown in FIG. 2, the drink holders 40 at or near the rear of the center console 22 are moved closer to the rear seated passenger 96. At the same time, the pet bowl 50 is moved closer to the pet 80 in the rear row of seating. As a result, the rear seated passenger 96 may more easily access the drink holders 40 and the pet 80 may access the pet bowl 50 to consume content, such as water.

The vehicle 10 is shown containing a pet 80, such as a dog, sitting on one of the rear seats 16E for travel as an occupant within the cabin interior 14 of the vehicle 10. It should be appreciated that the vehicle 10 may transport any of a number of living beings, including one or more persons and one or more pets such as dogs and cats, for example. The pet 80 is shown wearing a wearable device in the form of a collar 82 which is equipped with a radio frequency (RF) signal communication device such as an RF signal transmitter 84. It should be appreciated that the pet 80 may be positioned at any of a number of locations within the cabin interior 14 of the vehicle 10 and may move about the cabin interior 14 if unrestrained. Depending on the location of the pet 80 within the cabin interior 14, the movable center console 22 may be controllably moved to one or more adjustable positions as disclosed herein.

The vehicle 10 may monitor for the presence and determine the location of the passenger 96 and/or pet 80 within the cabin interior 14 using one or more imaging devices, such as cameras and/or monitoring radio frequency (RF) signals associated with RF signal communication device(s) such as the RF signal transmitter 84 located on the pet 80. The vehicle 10 is equipped with one or more imaging devices, which may include three imaging devices 30A-30C located at various locations within the cabin interior 14 to capture images of the cabin interior 14. The imaging devices 30A-30C may include cameras that capture images of the cabin interior 14. It should be appreciated that cabin interior 14 may be equipped with one or more imaging devices. The imaging devices 30A-30C may compare known images of passengers and pets with image signals captured by one or more of the imaging devices 30A-30C within the cabin interior 14 and determine the presence of one or more passengers 96 and pets 80 within the cabin interior 14. This may be accomplished by using image processing identifying features in the captured images associated with a pet, such as a dog and features associated with a passenger. By monitoring the image signals captured with the imaging devices 30A-30C, the presence and movement of a passenger 96 or pet 80 within the cabin interior 14 may be detected. For example, a pet 80 may be detected on a rear seat, such as seat 16E as shown in FIG. 1, and its movement to a position on top of or proximate to the front passenger seat 16B, may be detected. In the position shown in FIG. 1, the presence of a pet 80 located on the seat 16E rearward of the center console 22 may be used to control the position of the center console 22 to present a pet bowl 50 to a position closer to the pet 80 based on the detected location of the pet 80 positioned rearward of the center console 22. Similarly, by monitoring the location of the passenger 96 in a rear seat rearward of the center console 22, the controller may process the image signals and determine if the passenger 96 is holding a drink and reaching for the drink holder in the center console 22 and, if so, may move the center console 22 rearward towards the passenger 96. Similarly, the controller may determine that the passenger 96 is reaching for a drink in the drink holder on the center console 22, and the center console 22 may be actuated to move rearward toward the passenger 96. The center console 22 may return to the forward position when neither the pet nor the passenger 96 are determined to no longer desire access to the drink holder or pet bowl.

Figure 2:
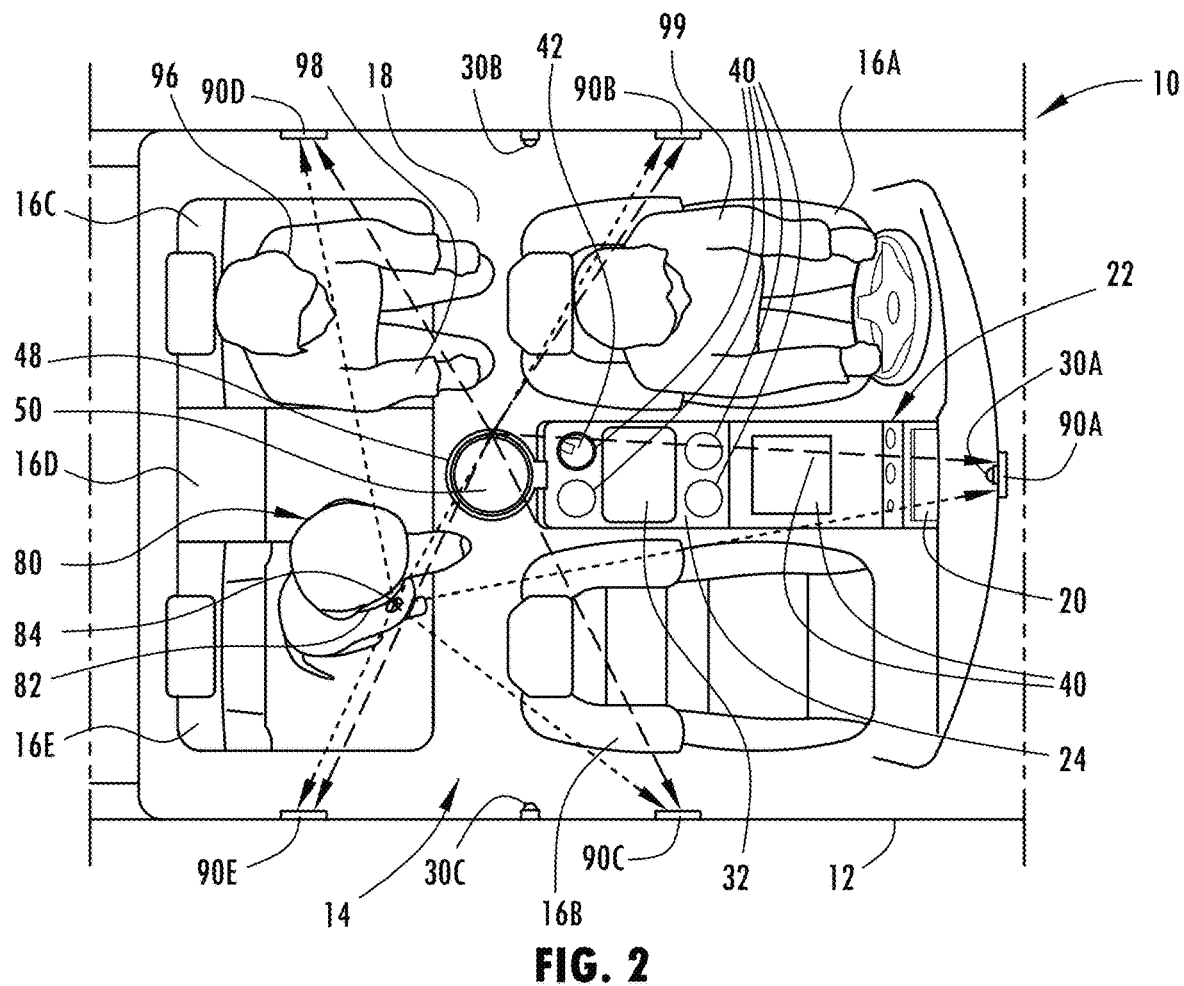
FIG. 2 is a top view of the cabin interior transporting the passenger and pet seated on passenger seats within the cabin interior with the movable center console in a second rearward position.

As seen in FIGS. 1 and 2, the vehicle 10 is configured to include a plurality of first RF signal communication devices shown and described herein as a plurality of RF receivers 90A-90E positioned at different locations on board the vehicle 10. In the example shown, the vehicle 10 is equipped with five (5) RF receivers 90A-90E, however, it should be appreciated that any number of RF receivers may be employed. The RF receivers 90A-90E each may receive RF signals transmitted by one or more RF transmitters including the RF transmitter 84 located on the collar 82 of the pet 80 and an RF signal transmitter 74 on the pet bowl 50. The RF receivers 90A-90E may be configured as RF transceivers which may allow for the transmission and reception of RF signals. As such, RF transceivers may receive the RF transmit signals from the RF transmitters 84 and 74 and may further transmit signals to other communication devices on-board or off-board the vehicle 10.

The RF transmitters 84 and 74 may each be configured as an RF transceiver that both transmits and receives RF signals. The RF transmitters 84 and 74 may use Bluetooth® low energy (BLE) operating centered in 2.4 GHz ISM band (Industrial Scientific and Medical) and used for wireless personal area networks, according to one example. According to another example, the RF transmitters 84 and 74 may use an Ultra Wide-Band (UWB) protocol which may operate in the 6-8 GHz band. With both BLE and UWB, the system may employ the use of Round-Trip Time (RTT) Time of Flight (ToF) to establish the pet collar location or pet bowl location through triangulation or other methods such as Angle-of-Arrival (AoA), Received Signal Strength Indication (RSSI), Phase or other methods. Further, other technologies may be used such as low frequency (i.e., 125-134 kHz) RSSI or acoustic or ultrasonic sound.

As seen in FIGS. 1 and 2, the RF signal communication device embodied as an RF transmitter 84 is located on the collar 82 worn on the pet 80 and transmits a low energy RF signal that may be received by each of the five RF receivers 90A-90E. RF receiver 90A is shown located at a position generally at the forward end of the cabin interior 14, RF receivers 90B and 90C are shown located on opposite left and right lateral sides of the front row of seating, and RF receivers 90D and 90E are shown located on opposite left and right lateral sides of the second row of seating. As such, each of the RF receivers 90A-90E is located in a different location separated from the other RF receivers 90A-90E. The RF signal transmitted from the RF transmitter 84 is received by each of the RF receivers 90A-90E and is processed to determine a location of the pet 80. According to one embodiment, this may be achieved by processing the received signal strength or amplitude of the RF signal received at each of the RF receivers 90A-90E and determining via triangulation a geographic location of the pet 80. By determining the amplitude of the RF signal received by each RF receivers 90A-90E, the distance from each RF receiver to the RF transmitter can be determined. Given the relative location to each RF receiver, the location of the RF transmitter transmitting the processed signal can be determined using triangulation or trilateration.

Figure 3:
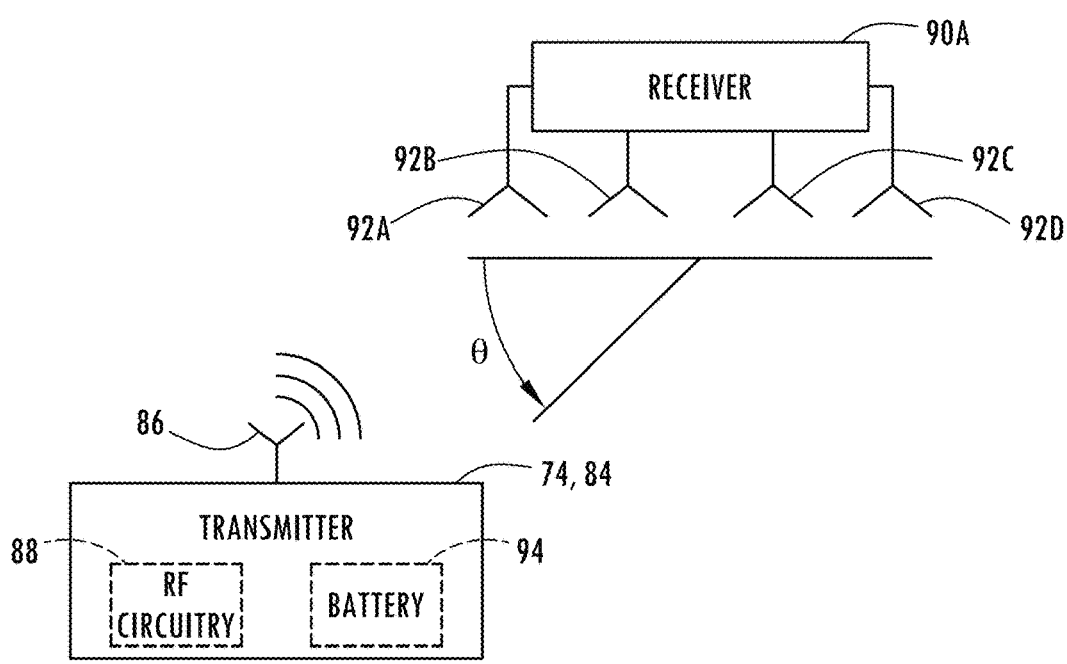
FIG. 3 is a schematic view of an RF signal transmitter communicating with an RF signal receiver to track location of the RF signal transmitter, according to one example.

According to another embodiment, the RF receivers 90A-90E may include a plurality of antennas that further enable determination of an approximate angle θ of arrival as shown in FIG. 3 to provide enhanced accuracy determination to the location of the RF transmitter 84 associated with the pet 80 and RF transmitter 74 located on the pet bowl 50. In this embodiment, RF receiver 90A is shown having a plurality of antennas, shown as four antennas 92A-92D for receiving an RF signal transmit from the RF transmitter 84 or 74 with antenna 86 and determining an angle θ of arrival of the signal based on the arrangement of the plurality of antennas 92A-92D. The amplitude of the signal received at each of the RF receivers 90A-90E may further be processed to determine distance to each RF receivers and to determine an accurate position of the RF transmitter by using triangulation or trilateration. RF receivers 90A-90E may likewise be configured as shown in FIG. 3. According to a further embodiment, the location of the RF transmitter may be determined based on a determined round trip time of flight.

As such, the pet 80 may be monitored and the location of the RF transmitter 84 on the pet 80 determined by processing the RF signals received with the RF receivers 90A-90E with a controller. Similarly, the pet bowl 50 may be monitored. The driver and passengers in the vehicle 10 may be notified of the location of the pet 80 and pet bowl 50 on a human machine interface (HMI), such as a vehicle display screen 20. The determined location of the pet 80 may be used to control various functions on board the vehicle 10 such as adjusting the position of the center console that the pet 80 is seated behind.

The RF transmitters 84 and 74 may each include an antenna 86, RF circuitry 88, and an electrical power source in the form of a battery 94. The vehicle 10 may provide an output signal to indicate when the pet collar battery 94 is running low so that the battery 94 may be replaced. Alternatively, the first RF signal communication devices may be configured as transceivers that may be used as power sources from which a battery-less transceiver on the pet collar 82 or pet bowl 50 can harvest energy and then act as a transponder thus ensuring the pet monitoring system may operate without a battery. This may be achieved by harvesting energy from the RF signal received by the antenna with a blocking diode that charges one or more capacitors. While the RF transmitter 84 is shown located on the pet collar 82, it should be appreciated that the RF transmitter 84 may be located elsewhere on the pet 80 or an accessory associated with the pet 80 to provide signals used to identify the location of the pet 80.

The RF transmitters 84 and 74 may be configured to only transmit when located in a vehicle or to transmit at a higher transmission rate when in a vehicle, so as to consume less battery power. The RF transmitters 84 and 74 can remain in a dormant state and can be prompted to an active state by the vehicle system or may transmit signals only on request so as to further conserve the battery power. For example, with the RF transmitters 84 and 74 configured as RF transceivers, the RF transceiver may receive a signal prompting the RF transmitter portion of the transceiver to transmit signals upon request and may otherwise remain in the dormant state to thereby conserve battery power.

While the second RF signal communication device in the form of the RF transmitter 84 is shown located on a pet collar 82 or pet bowl 50 and the first RF signal communication devices in the form of the RF receivers 90A-90E are located on the vehicle 10, it should be appreciated that the RF transmitters 84 and 74 may be configured as an RF transceiver that may be located on either the pet collar 82 or the vehicle 10 and the plurality of RF receivers 90A-90E may be located on the vehicle 10 or the pet collar 82, according to further embodiments.

The passenger 96 may be equipped with a portable electronic device, such as a smartphone having Bluetooth® low energy (BLE) which may operate as a RF signal transmitter to communicate with one or more RF signal receivers. As such, the location of the passenger 96 may be monitored by tracking the portable electronic device which may communicate with the RF receivers 90A-90E to determine which seat the passenger 96 is seated on.

Referring to FIGS. 4 and 5, the center console 22 is generally illustrated in the forward first position in FIG. 4 and the rearward second position in FIG. 5. The center console 22 includes a movable upper housing 24 operatively coupled to a fixed lower base 26. The fixed lower base 26 may be fixedly attached to the vehicle floor 18 or other structure on the vehicle 10. The movable upper housing 24 moves forward and rearward relative to the fixed lower base 26 between the first and second positions. To actuate the movable upper housing 24, the center console 22 has a rack 36 provided on an under surface of the movable upper housing 24 meshingly engaged with a gear 34 which is driven by an actuator, shown as an electric motor 38. The rack 36, gear 34, and motor 38 thereby provide a linear actuator 28 for actuating the movable upper housing 24 to the first and second positions and intermediate positions therebetween.

The pet bowl 50 is shown in FIG. 4 stored within a front bin 44 in the upper forward surface of the fixed lower base 26, when the pet bowl 50 is not in use. When the movable upper housing 24 is moved to the rearward second position, the front bin 44 is exposed and accessible. In this position, the pet bowl 50 may remain within bin 44 and may be accessed from the front side of the center console 22. When a pet is expected to be in the vehicle, the pet bowl 50 may be manually moved to the rear end of the movable upper housing 24 as shown in FIG. 5. The pet bowl 50 is shown placed within an attachable bin 48 on or near the rear end of the upper housing 24. The attachable bin 48 has an L-shaped arm 60 on one end that allows for connection of the attachable bin 48 into a retaining slot 46 provided at the rear peripheral edge of the movable upper housing 24. The attachable bin 48 allows the pet bowl 50 to be removably attached to the center console 22. When a pet 80 is detected by the monitoring system on a seat rearward of the center console 22, and liquid, e.g., water or food is detected in the pet bowl 50, the center console 22 may be actuated to move the movable upper housing 24 rearward to a position closer to the pet 80 so that the pet 80 can more easily access the pet bowl 50. Similarly, when a passenger 96 is detected on a rear seat of the vehicle and has a drink detected in their arm and hand or the passenger 96 is detected is reaching for a drink on the center console 22, the center console 22 may be actuated to move the movable upper housing 24 rearward into closer proximity with the rear seated passenger. As a result, drink holder(s) and drink container(s) are made more accessible with the center console 22 for a pet 80 or passenger 96 seated in a rear seat rearward of the center console 22.

Figure 6:
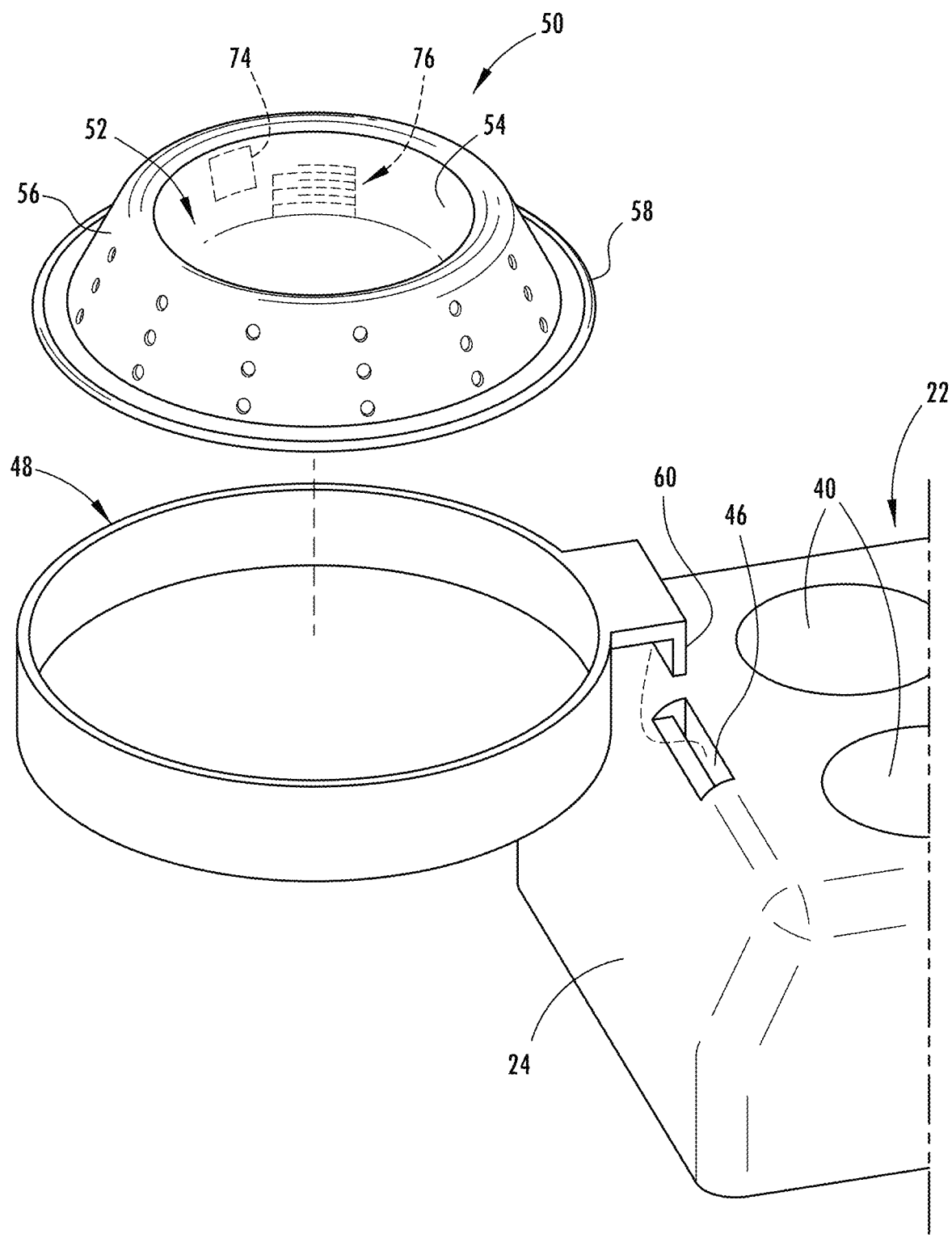
FIG. 6 is a perspective view of the bin and pet bowl exploded from the center console, according to one embodiment.

Referring to FIG. 6, the attachable bin 48 and pet bowl 50 are shown exploded from the center console 22. The L-shaped arm 60 fits within retaining slot 46 on the center console 22 and the pet bowl 50 may be inserted on top of the attachable bin 48. The pet bowl 50 has an interior side wall 54 defining a container 52 which may hold a liquid, such as water or other content. The pet bowl 50 also has an exterior side wall and a peripheral rim 58 extending radially outward to the periphery. The exterior side wall 56 is angled inward from the bottom rim 58 upward according to the example shown, but may be at other angles or may be substantially vertically. The pet bowl 50 may have other shapes such as square, rectangular, hexagonal, etc. It should be appreciated that the pet bowl 50 may receive other content, such as food. As such, the pet bowl 50 may be used to provide water or food for consumption by one or more pets.

The pet bowl 50 is shown having the RF transmitter 74 located on the exterior side of the interior side wall 54. The RF transmitter 74 may include an antenna and an electrical power source in the form of a battery similar to RF transmitter 84. The RF transmitter 74 communicates with the RF receivers 90A-90E to determine location of the pet bowl 50.

The pet bowl 50 further includes one or more proximity sensors 76, shown in the form of a capacitive sensor, extending on the outer surface of the side wall 54 and may extend onto a portion of the bottom wall for sensing a liquid level, i.e., depth of the water or other liquid contained in the container 52. It should be appreciated that one or more capacitive sensors may be employed to sense the liquid level in the pet bowl 50. At least one of the capacitive sensors may extend from the bottom wall to a location sufficiently high enough on the side wall 54 to sense the height or depth of the liquid within the container 30. Accordingly, the one or more proximity sensors 76 provide a form of liquid level sensing which may indicate whether or not the pet bowl 50 has a sufficient amount of liquid contained therein. If the pet bowl 50 is empty or low on liquid, an alert may be sent to the vehicle driver, such as via the display 20. It should be appreciated that the pet bowl 50 may communicate the sensed liquid level with the RF transmitters 74 to the controller. The sensed level of water in the pet bowl 50 may be used to determine whether to move the center console 22 towards a pet.

Figure 7:
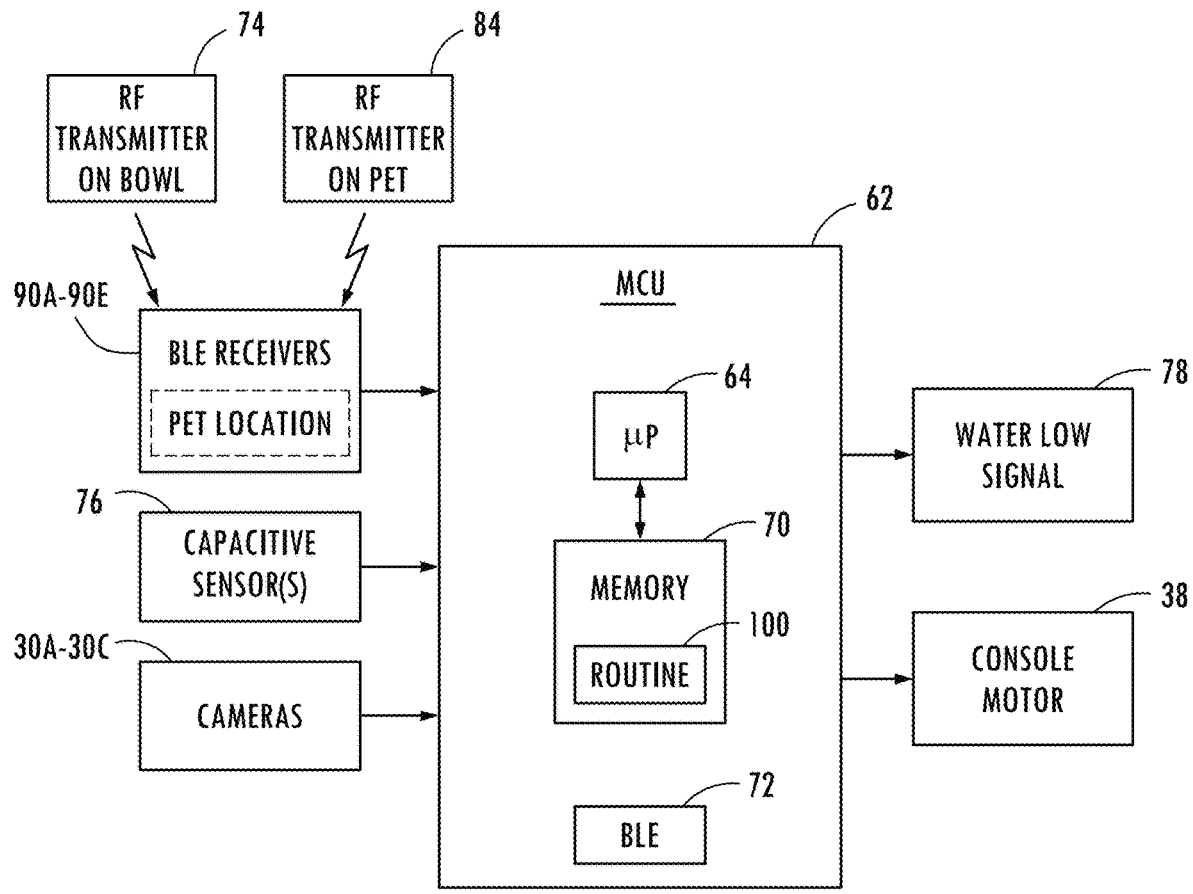
FIG. 7 is a block diagram illustrating a controller configured to control movement of the center console between the first and second positions.

Referring to FIG. 7, a controller 62 is shown for receiving various inputs and controlling various outputs depending upon the sensed location of the pet 80. The controller 62 is shown configured as a microcontrol unit (MCU) having a microprocessor 64 and memory 70. It should be appreciated that any analog and/or digital control circuitry may be employed as the controller 62. Stored within memory 70 and executed by microprocessor 64 are one or more control routines 100. Additionally, the controller 62 is shown having a wireless communication device 72, such as a Bluetooth® low energy device (BLE). The controller 62 receives various inputs made available on the vehicle 10 including received RF signals from the BLE receivers 90A-90E which may be processed to determine the location of the pet 80 and pet bowl 50 by communicating via the RF transmitter 84 and RF transmitter 74 using signal triangulation or trilateration. Further the controller 62 receives video image signals captured from the imaging devices 30A-30C, such as cameras, located within the cabin interior. The controller 62 may process the captured image signals to detect the presence and determine the location and movement of one or more passengers and the passengers arms and hands and drink holder and/or one or more pets within the cabin interior. It should be appreciated that the controller 62 may determine the presence and location of the passenger or pet relative to a seat using one or both of the RF signals received with the RF receivers 90A-90E and the processed image signals received with one or more of the imaging devices 30A-30C.

The controller 62 determines a presence and location of a pet 80 and/or passenger within the vehicle cabin interior. If the pet 80 or passenger 96 is determined to be located on one of the seats, the controller 62 may control the one or more of the actuators to adjust the position of the center console to move the center console with a drink holder and/or pet bowl to a position closer to the pet 80 and/or passenger 96. The actuators may adjust the center console 22 between the forward first position and the rearward second position to present the drinks drink holders and pet bowl 50 to the passenger and pet 80 seated rearward.

Figure 8:
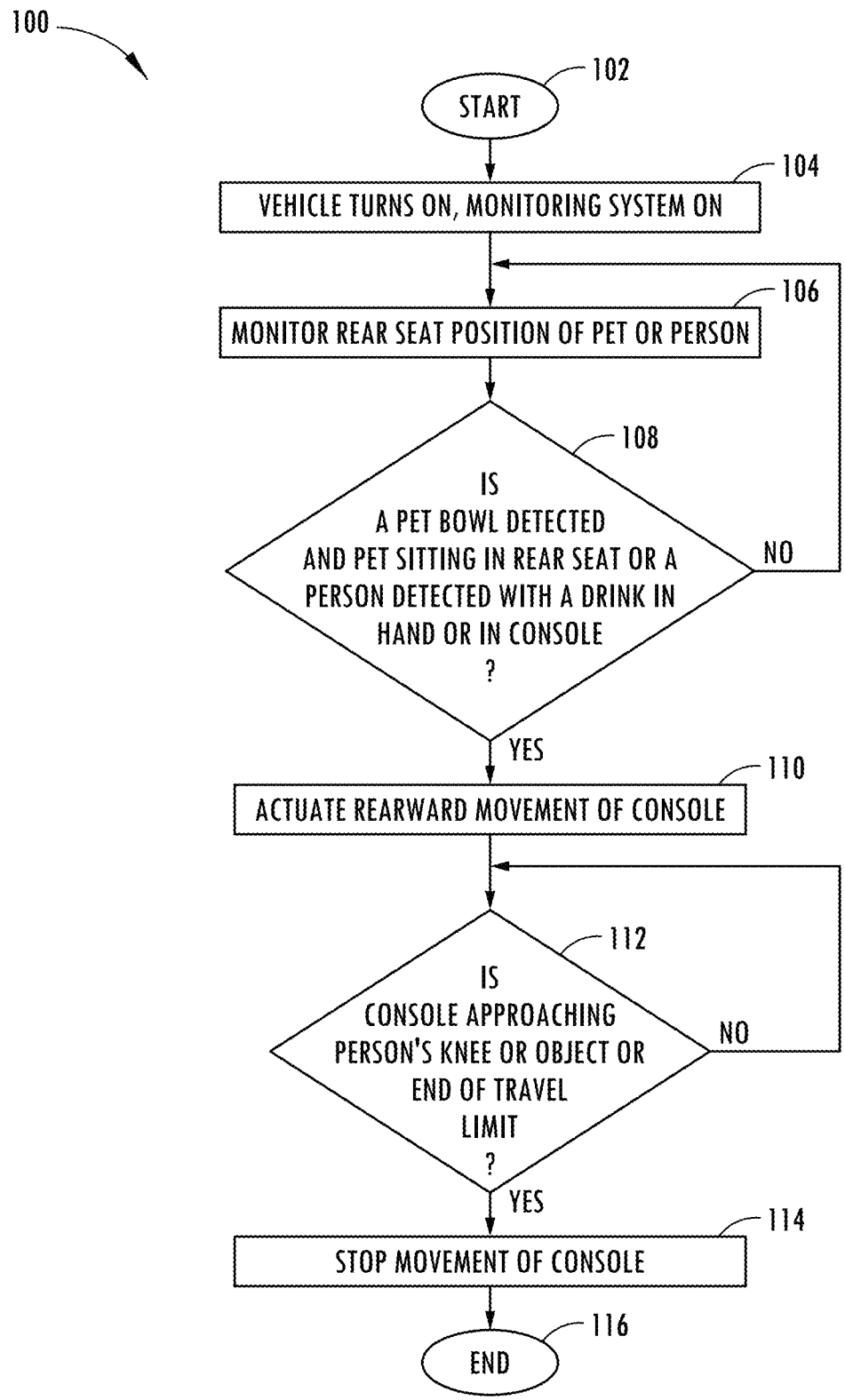
FIG. 8 is a flow diagram illustrating a control routine for controlling movement of the sliding console between the first and second positions based on a monitored pet or passenger.

The routine 100, which is executed by the controller 62, is shown in FIG. 8, according to one example. Routine 100 begins with step 102 and proceeds to step 104 to turn on the vehicle and the camera monitoring system. Next, routine 100 proceeds to step 106 to monitor the rear seat position of a pet or passenger. This may include the use of the imaging devices and/or RF communication devices. Proceeding to decision step 108, routine 100 determines if a pet bowl has been detected and pet is sitting in a rear seat or if a person is detected with a drink the hand or in the console and, if not, returns to step 106. If a pet bowl is detected and a pet is sitting in the rear seat or a person is detected with a hand in hand or in the console, routine 100 proceeds to step 110 to actuate rearward movement of the console from the first position to the second position to thereby move the drink holder and pet bowl closer to the passenger and pet. Routine 100 proceeds to decision step 112 to determine if the console is approaching a person's knee or other object or reaches an end-of-limit travel and, if so, stops movement of the console in step 114 before ending at step 116. Otherwise, the console continues to move until the end-of-limit position.

Accordingly, the vehicle 10 advantageously provides for monitoring of the location of the pet 80 and/or passenger within a vehicle and controls movement of the center console based on the determined location of the pet and/or person to present a drink and/or drink holder to a position closer to the passenger and/or pet. As a result, the seat may be reconfigured to better accommodate the pet or passenger.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a vehicle body defining a cabin interior;
   a plurality of seats located within the cabin interior;
   a monitoring system for detecting and monitoring a pet or passenger within the cabin interior;
   a movable console positioned forward of a seat and comprising a holder for holding an item; and
   a controller processing signals generated by the monitoring system and determining a location of the detected pet or passenger on the seat based on the processed signals, the controller further controlling the movable console between a first position and a second position to move the holder closer to the detected pet or passenger.

2. The vehicle of claim 1, wherein the movable console is a sliding console comprising an actuator for actuating at least a portion of the console with the holder forward to the first position and rearward to the second position.

3. The vehicle of claim 2, wherein the sliding console is a sliding center console located between a pair of front row seats, and wherein the sliding console moves from the first position to the second position closer to a rearward second row of seats.

4. The vehicle of claim 1, wherein the holder comprises a drink holder for holding a drink container.

5. The vehicle of claim 1, wherein the holder comprises a bin holding a pet bowl configured for use by a pet.

6. The vehicle of claim 5, wherein the pet bowl further comprises a capacitive sensor for sensing an amount of liquid in the pet bowl.

7. The vehicle of claim 1, wherein the holder comprises a recessed drink holder configured for holding a drink container for use by a passenger.

8. The vehicle of claim 1, wherein the monitoring system comprises one or more imaging devices for capturing image signals of the pet or passenger within the vehicle, wherein the controller processes the captured image signals to determine a presence of the pet or passenger and a location of the pet or passenger within the vehicle.

9. The vehicle of claim 1, wherein the monitoring system comprises:
   a plurality of first RF signal communication devices located at a plurality of locations on the vehicle; and
   a second RF signal communication device configured to be located on a pet for communicating RF signals with the plurality of first RF signal communication devices, wherein the controller processes the RF signals and determines the location of the pet based on the processed RF signals.

10. The vehicle of claim 9, wherein the second RF signal communication device is located on a wearable device of the pet.

11. A vehicle comprising:
    a vehicle body defining a cabin interior and comprising a front row of seats and a rear row of seats;
    a plurality of seats located within the cabin interior;
    a monitoring system for detecting and monitoring a pet or passenger within the cabin interior;
    a movable center console positioned between a pair of the front row of seats and forward of the rear row of seats and comprising a drink holder for holding a drink container; and
    a controller processing signals generated by the monitoring system and determining a location of the detected pet or passenger on the rear row of seats based on the processed signals, the controller further controlling the movable console between a forward first position and a rearward second position closer to the rear row of seats to move the drink holder closer to the detected pet or passenger.

12. The vehicle of claim 11, wherein the movable console is a sliding console comprising an actuator for actuating at least a portion of the console with the drink holder forward to the forward first position and rearward to the rearward second position.

13. The vehicle of claim 11, wherein the drink holder comprises a bin holding a pet bowl configured for use by a pet.

14. The vehicle of claim 13, wherein the pet bowl further comprises a capacitive sensor for sensing an amount of liquid in the pet bowl.

15. The vehicle of claim 11, wherein the drink holder comprises a recessed drink holder configured for holding a drink container for use by a passenger.

16. The vehicle of claim 11, wherein the monitoring system comprises one or more imaging devices for capturing image signals of the pet or passenger within the vehicle, wherein the controller processes the captured image signals to determine a presence of the pet or passenger and a location of the pet or passenger within the vehicle.

17. The vehicle of claim 11, wherein the monitoring system comprises:
    a plurality of first RF signal communication devices located at a plurality of locations on the vehicle; and
    a second RF signal communication device configured to be located on a pet for communicating RF signals with the plurality of first RF signal communication devices, wherein the controller processes the RF signals and determines the location of the pet based on the processed RF signals.

18. The vehicle of claim 17, wherein the second RF signal communication device is located on a wearable device of the pet.

19. A method of controlling a sliding console in a vehicle, the method comprising the steps of:
- detecting a pet or passenger within the vehicle with a monitoring system;
- determining a location of the pet or passenger within the vehicle on a seat; and
- controlling the sliding console with a controller to adjust a position of the sliding console to move the sliding console with a drink holder toward the pet or passenger detected in the seat.

20. The method of claim 19, wherein the sliding console comprises a sliding center console and the seat is rearward of the center console, wherein the controller adjusts a position of the sliding console to move rearward toward the seat.

\* \* \* \* \*